United States Patent [19]

Wataya

[11] Patent Number: 5,023,919
[45] Date of Patent: Jun. 11, 1991

[54] APPARATUS AND METHOD FOR TREATING ENCODED IMAGE DATA INCLUDING CORRECTION FOR ENCODING/DECODING DETERIORATION

[75] Inventor: Masafumi Wataya, Tokyo, Japan

[73] Assignee: Canon Kabushiki Kaisha, Tokyo, Japan

[21] Appl. No.: 146,084

[22] Filed: Jan. 20, 1988

[30] Foreign Application Priority Data

Jan. 28, 1987 [JP] Japan .............................. 62-015945

[51] Int. Cl.⁵ .............................................. G06K 9/00
[52] U.S. Cl. ..................................... 382/54; 358/166; 358/167; 382/56
[58] Field of Search ....................... 382/56, 57, 42, 43, 382/41, 54, 44; 358/283, 261.2, 284, 280, 166, 167; 364/138, 200; 370/95; 371/49, 37; 341/143, 144

[56] References Cited

U.S. PATENT DOCUMENTS

| 4,694,342 | 9/1987 | Klees ................................. 358/167 |
| 4,797,945 | 1/1989 | Suzuki et al. ..................... 382/56 |
| 4,807,033 | 2/1989 | Keesen et al. .................... 358/166 |

*Primary Examiner*—Leo H. Boudreau
*Attorney, Agent, or Firm*—Fitzpatrick, Cella, Harper & Scinto

[57] ABSTRACT

A decoding apparatus for decoding encoded image data includes a decoding circuit for decoding encoded image data, a post-processing circuit including e.g., smoothing and edge emphasis circuits for respectively performing smoothing and edge emphasis on the image data decoded by the decoding circuit, and a selector for selecting the smoothing the edge emphasis circuit in accordance with the image data decoded by the decoding circuit. For example, the selector can select between the smoothing and edge emphasis circuit based on whether or not the decoded image data is detected to have suffered deterioration or degradation as a result of the encoding/decoding of it.

28 Claims, 9 Drawing Sheets

FIG. 1

FIG.2(a) ORIGINAL IMAGE

PIXEL

FIG.2(b) DECODED IMAGE

FIG.2(c) AFTER POST-PROCESSING

FIG.2(d)

DENSITY

FIG.2(e)

DENSITY

FIG.2(f)

DENSITY

| -1 | 0 | 1 |
|---|---|---|
| -1 | 0 | 1 |
| -1 | 0 | 1 |

FIG.9(b)

| -1 | -1 | -1 |
|---|---|---|
| 0 | 0 | 0 |
| 1 | 1 | 1 |

FIG.9(c)

| 0 | 1 | 0 |
|---|---|---|
| -1 | 4 | -1 |
| 0 | -1 | 0 |

APPARATUS AND METHOD FOR TREATING ENCODED IMAGE DATA INCLUDING CORRECTION FOR ENCODING/DECODING DETERIORATION

BACKGROUND OF THE INVENTION:

1. Field of the Invention

The present invention relates to a method and apparatus for decoding encoded image data, which has been encoded by, e.g., block encoding.

2. Related Background Art

When a document or an image is transmitted or stored, a redundancy reduction code is used to shorten transmission time or to effectively utilize a storage medium. Redundancy reduction encoding is roughly classified into two encoding methods. One method is called a reversible encoding method, and the other method is called an irreversible encoding method.

In the reversible encoding method, data is reversibly encoded. Therefore, loss of information, i.e., deterioration of image quality does not occur. Typical reversible encoding methods are the MH (modified Huffman) and the MR (modified READ) encoding which are used in facsimile systems. The reversible encoding method was developed to process binary data.

Irreversible encoding method include block encoding, vector quantization, orthogonal conversion encoding, and the like. The assignee of the present invention has proposed the irreversible encoding method in U.S. Pat. No. 4,797,945. However, when the irreversible-encoded data is decoded, information is normally lost, resulting in deterioration of image quality.

Deterioration of image quality in the irreversible encoding method does not occur in a region where variations in gray level or tone are small, but noticeably occurs in regions where variations in gray level are large, e.g., an edge portion of a character. As a result, an edge of a character is made unclear or blurred. In a region where variations in gray level are small, a block becomes conspicuous, and gradation visibly deteriorates.

SUMMARY OF THE INVENTION

It is an object of the present invention to provide a method and apparatus for the decoding of encoded image data, which are free from the conventional drawbacks, and can correct a degraded image the deterioration in which is due to the encoding and decoding operations, to obtain an image which does not suffer from image quality deterioration.

It is another object of the present invention to provide a decoding apparatus and method for decoding encoded image data, which correct deterioration of an image in accordance with characteristics of decoded image data.

It is still another object of the present invention to provide a decoding apparatus and method for decoding encoded image data, which selectively perform a plurality of types of deterioration correction processing for decoded image data.

The above and other objects and effects of the present invention will be apparent from the following detailed description of the preferred embodiment.

DETAILED DESCRIPTION OF THE PREFERRED EMBODIMENT:

An embodiment of the present invention will be described hereinafter in detail with reference to the accompanying drawings. For the sake of simplicity, encoding used in the following embodiment is block encoding, wherein image data is divided into blocks each having a predetermined size, and a block of interest is represented by an average density of image data in the block.

<Summary of the Embodiment>

Figure 1:
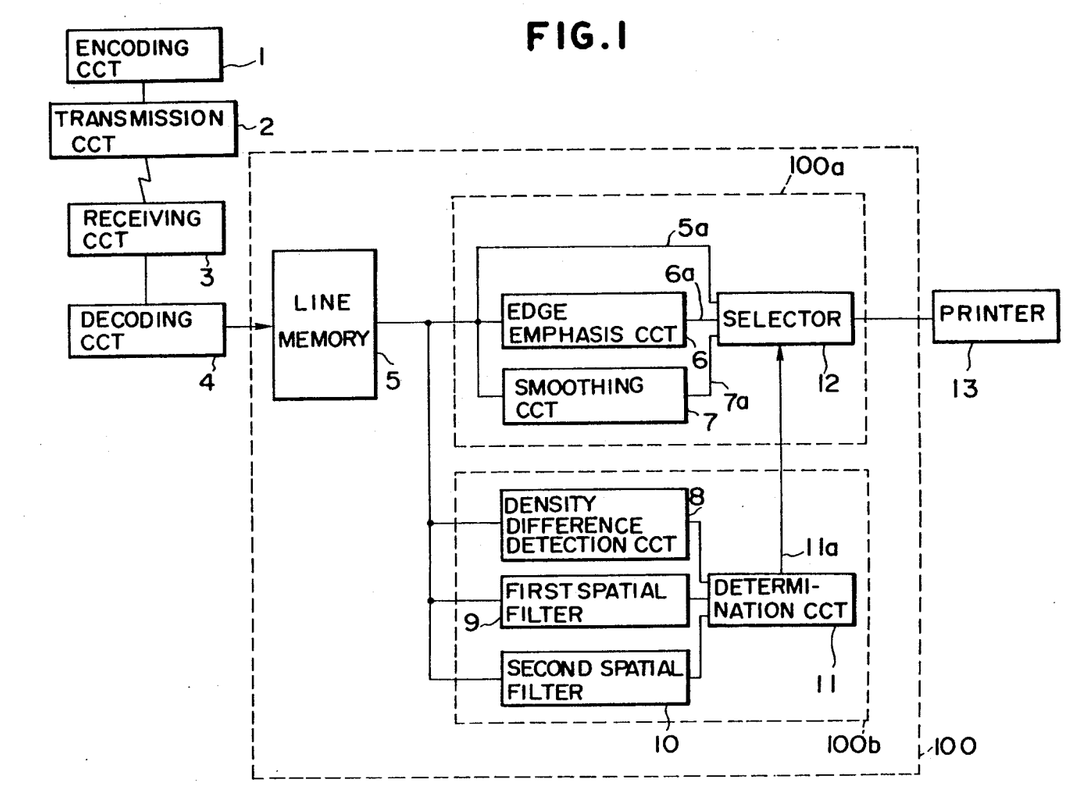
FIG. 1 is a block diagram of an embodiment in which a decoding apparatus according to the present invention is applied to a printing apparatus.

FIG. 1 is a block diagram showing an embodiment in which a decoding apparatus according to the present invention is applied to a printing apparatus which receives block-encoded image data, performs image processing, and prints the processed image data. With this printing apparatus, when image data which is block-encoded by an encoding circuit 1 is transmitted by a transmission circuit 2, a receiving circuit 3 of the printing apparatus receives the image data, and a decoding circuit 4 then performs predetermined decoding. FIGS. 2 and 3 show image data which is block-encoded and is then decoded.

<Example of Image Quality Deterioration>

Figure 2A:
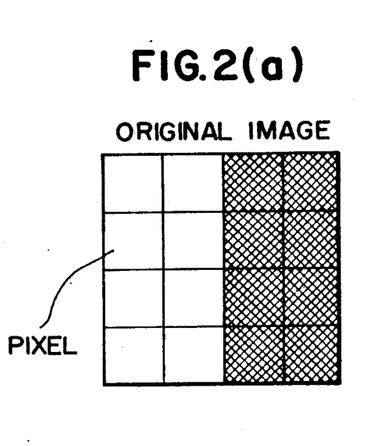
FIGS. 2(a) to 2(f) and FIGS. 3(a) to 3(f) are views for explaining correction states of an image which suffers from image quality deterioration.
Figure 2B:
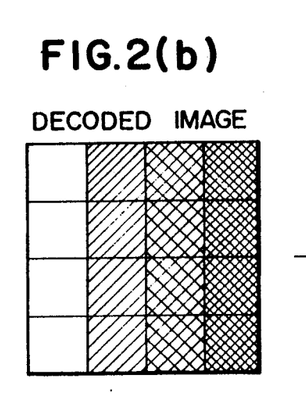
Figure 2C:
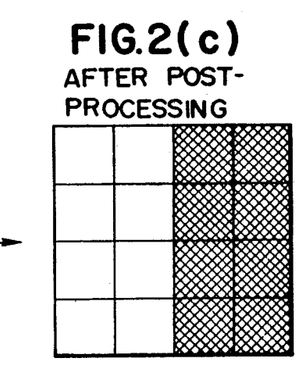
Figure 2D:
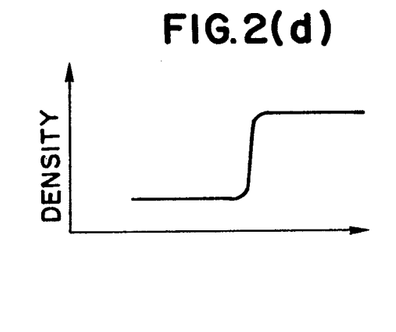
Figure 2E:
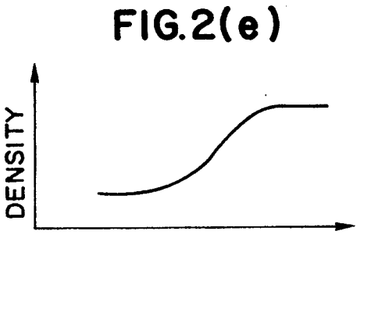

FIG. 2(a) shows an original image, and FIG. 2(d) shows its one-dimensional density distribution along the abscissa of FIG. 2(a). The encoding circuit 1 shown in FIG. 1 block-encodes an original image using a 4×4 (pixel) block unit. That is, instead of transmitting 16 (=4×4) pixels, an average density in a block is transmitted. In such irreversible encoding, information of a pixel having a density different from the average density is lost. Therefore, even if the received image data is decoded by the decoding circuit 4, if an original image has an edge, its sharpness may be lost, as shown in FIGS. 2(b) and 2(e).

FIG. 3 shows another original image in which gray levels moderately change. In this case, a block encoding unit is also a 4×4 (pixel) block for the sake of simplicity. When image data which is encoded by an average density of a 4×4 block is decoded, its density is changed stepwise, as shown in FIGS. 3(b) and 3(e). In this case, moderate changes in gray levels from one part of the block of the original image to the next is also lost.

<Summary of Post-Processing>

In view of the above, image quality deterioration is corrected by a post-processing circuit 100 as the characteristic feature of this embodiment. More specifically, the post-processing circuit 100 performs edge emphasis on an image whose edge property is lost using an edge emphasis circuit 6, and performs smoothing for an image which is deteriorated as a result of having a stepped change in density using a smoothing circuit 7, thereby correcting the image. The corrected image data is output to a known printer 13 (or a high-resolution CRT apparatus), and is reproduced with high reproducibility and high quality. The post-processing circuit 100 will be described below. The post-processing circuit 100 performs image processing such as edge emphasis and smoothing. For this purpose, the post-processing circuit 100 comprises a line memory 5 for extracting a 3×3 block from decoded image data, a deterioration detection circuit 100b for detecting image quality deterioration of the extracted block, and a correction circuit 100a for performing appropriate correction in accordance with a detection result of image quality deterioration of the block of interest.

The correction circuit 100a comprises the edge emphasis circuit 6, the smoothing circuit 7, and a selector 12 for selecting one of an output 6a from the edge emphasis circuit 6, an output 5a from the line memory 5, and an output 7a from the smoothing circuit 7 in accordance with a detection result 11a from the deterioration detection circuit 100b.

The deterioration detection circuit 100b comprises a density difference detection circuit 8 for detecting a density difference in a 3×3 block extracted by the line memory 5, two spatial filters 9 and 10 for extracting high- and low-frequency components of a spatial frequency of the 3×3 block, and a determination circuit 11 for determining image quality deterioration from the density difference and the extracted spatial frequency.

<Edge Emphasis Processing>

Figure 2F:
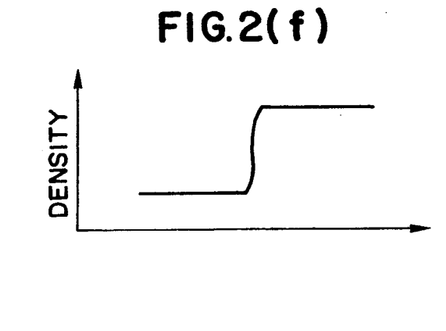
Figure 4:
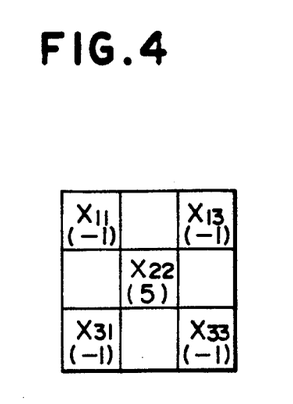
FIG. 4 shows a matrix of a spatial filter for edge emphasis.
Figure 5A:
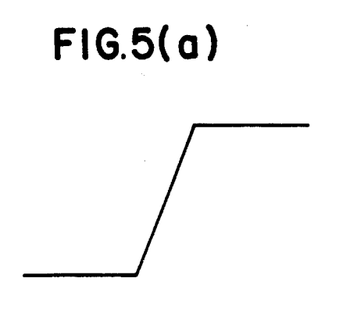
FIGS. 5(a) and 5(b) are views showing a state wherein an edge whose image quality is deteriorated is emphasized.
Figure 5B:
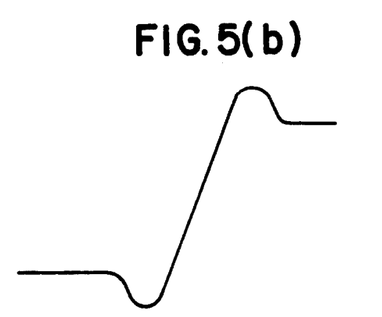

FIG. 4 shows a matrix of a Laplacian spatial filter used for edge emphasis This matrix has a size of 3×3 corresponding to a block extracted by the line memory 5. Nine pixel elements $X_{11}$ to $X_{33}$ are output from the line memory 5. Of these pixel elements, $X_{22}$ is here termed the pixel of interest in a block. In this case, matrix elements are $X_{22}=5$, $X_{11}=-1$, $X_{13}=-1$, $X_{31}=-1$, and $X_{33}=-1$. With this Laplacian filter, an edge portion of an image which is decoded as shown in FIG. 5(a) is emphasized and output as shown in FIG. 5(b). In the case of FIG. 2, an image as shown in FIGS. 2(c) and 2(f) is obtained.

Figure 6:
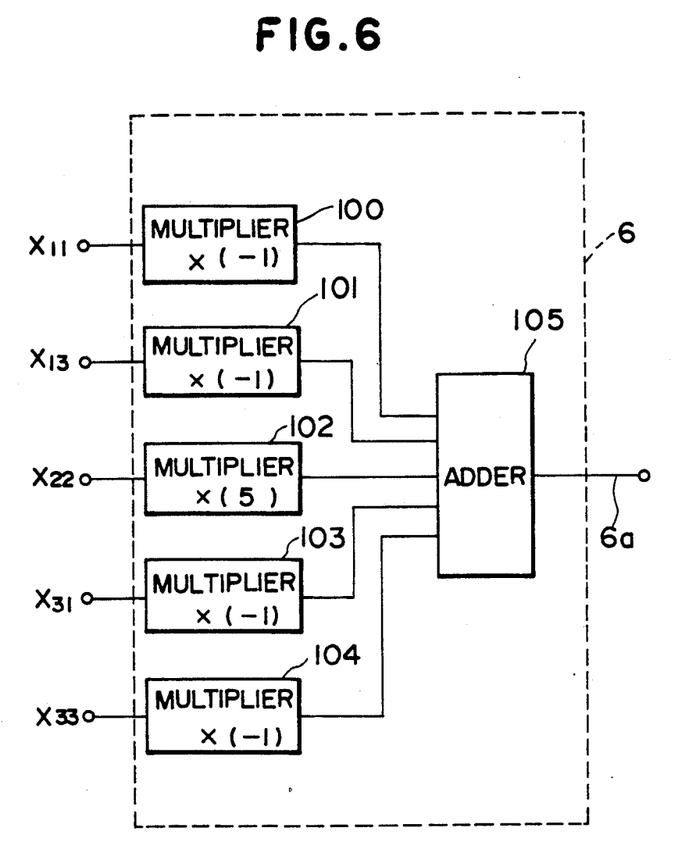
FIG. 6 is a block diagram of an edge emphasis circuit.

FIG. 6 is a detailed block diagram of the edge emphasis circuit 6. In this edge emphasis circuit 6, pixel densities of a block corresponding to $X_{22}$, $X_{11}$, $X_{13}$, $X_{31}$, and $X_{33}$ in the Laplacian matrix are input from line memory 5 to multipliers 100 to 104. The outputs which are multiplied with corresponding coefficients of the matrix from the multipliers are added to each other by an adder 105. More specifically, the output 6a from the adder 105 is as follows:

$$(-1)\cdot X_{11}+(-1)\cdot X_{13}+5\cdot X_{22}+(-1)\cdot X_{31}+(-1)\cdot X_{33}$$

The output 6a is input to the selector 12.

<Smoothing Processing>

Figure 7:
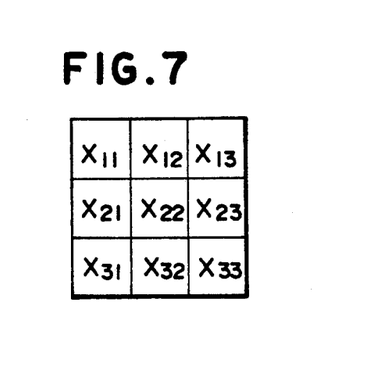
FIG. 7 shows a matrix of a smoothing spatial filter for smoothing.
Figure 8:
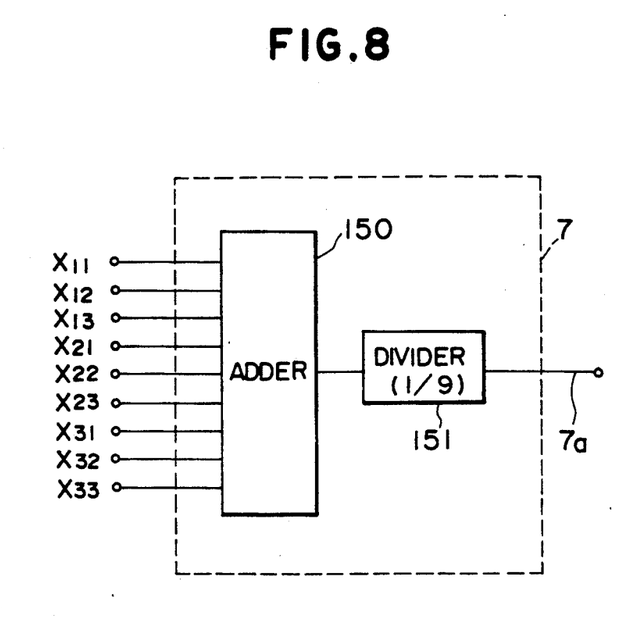
FIG. 8 is a block diagram of a smoothing circuit.

FIG. 7 shows a matrix of a spatial filter used in the smoothing circuit 7. All the coefficients in this matrix are 1/9, and a position of a pixel of interest corresponds to $X_{22}$. FIG. 8 shows an arrangement of the smoothing circuit 7. An adder 150 adds image densities $X_{11}$ to $X_{33}$ output from the line memory 5, and a divider 151 performs division by 9. The resultant output 7a is as follows:

$$(1/9) \sum_{i,j=1}^{3} X_{ij}$$

Figure 3A:
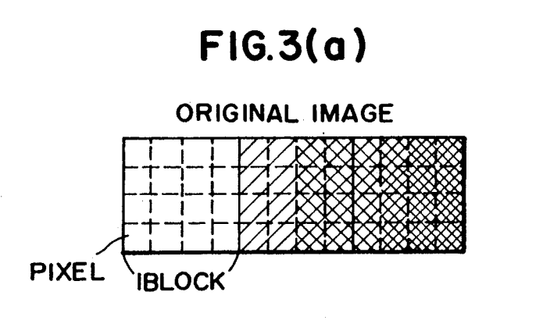
Figure 3B:
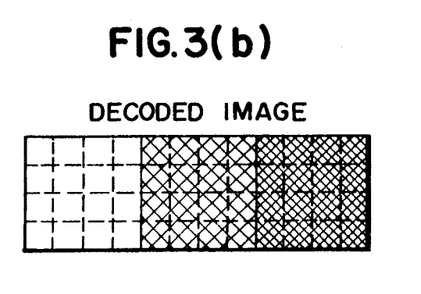
Figure 3C:
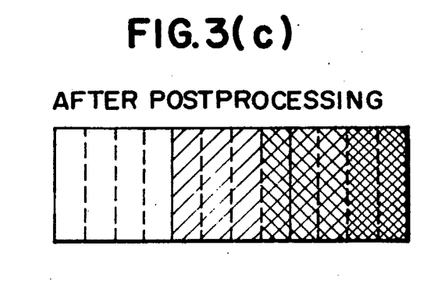
Figure 3D:
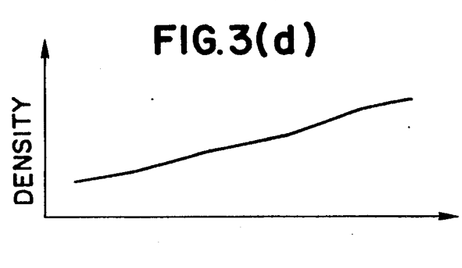
Figure 3E:
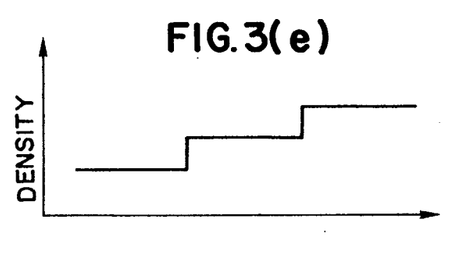
Figure 3F:
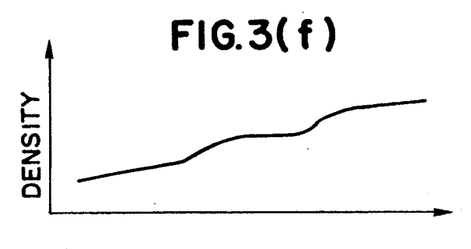

The resultant image is input to the selector 12, and is selected in accordance with a value of a deterioration detection signal 11a. In this case, an image having a stepped change in density as shown in FIGS. 3(b) and 3(e) is smoothed as shown in FIGS. 3(c) and 3(f), and the resultant image is similar to an original image.

<Image quality Deterioration Determination>

An operation of the deterioration detection circuit 100b for performing image quality deterioration determination will be described below. Image data $X_{11}$ to $X_{33}$ extracted by the line memory 5 are input to the edge emphasis circuit 6, the smoothing circuit 7, and the like, and the same image data are synchronously input to the density difference detection circuit 8, and spatial filters 9 and 10.

The density difference detection circuit 8 calculates the absolute value of a difference between an average value in the 3×3 block and the pixel of interest ($X_{22}$). In general, if the absolute value of the difference is smaller than a given threshold value, it can be considered that the pixel of interest is present in an area in which gray levels change relatively moderately. In contrast to this, if the absolute value is larger than the threshold value, it can be considered that an image is a character image with a blurred edge or an image having a stepped change in density due to block encoding, as shown in FIGS. 3(b) and 3(e). Therefore, when the density difference detection circuit 8 determines that the pixel of interest is present in an image area in which a change in density is small, the circuit 8 outputs data "0". When the circuit 8 determines that the pixel of interest is present in a character image area with a blurred edge (FIGS. 2(b) and 2(e)) or a stepped image area (FIGS. 3(b) and 3(e)), the circuit 8 outputs data "1".

Figure 9A:
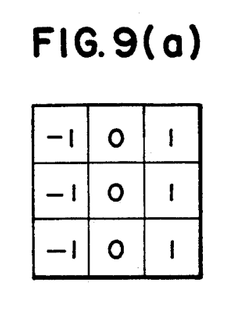
FIGS. 9(a) and 9(b) show matrices of a primary differential spatial filter for extracting a low-frequency component of image data.
Figure 9B:
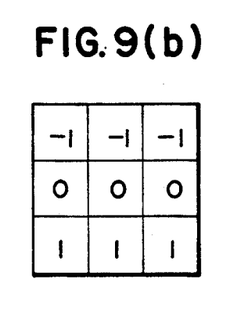
Figure 9C:
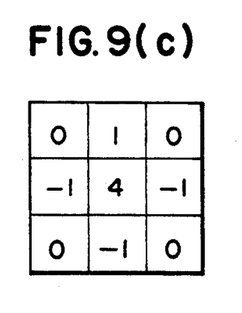
FIG. 9(c) shows a matrix of a secondary differential spatial filter for extracting a high-frequency component of image data.
Figure 10A:
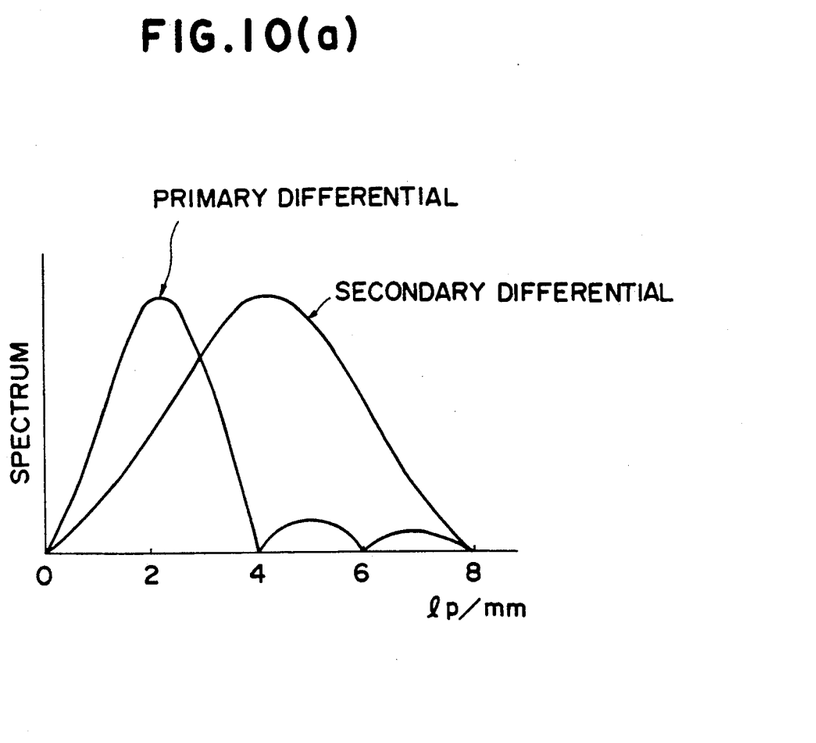
FIG. 10(a) is a graph showing spatial frequency characteristics of the primary and secondary differential filters.

The first spatial filter 9 constitutes a spatial filter for performing edge detection for an image having a relatively low frequency (about two line pairs lp/mm). For example, the spatial filter can be realized by combining primary differential filters having, e.g., the coefficients shown in FIGS. 9(a) and 9(b) in a matrix. The second spatial filter 10 constitutes a spatial filter for detecting a high-frequency component of a spatial frequency generated in image data decoded by the decoding circuit 4. The spatial filter can be realized by a secondary differential filter as shown in FIG. 9(c). According to general filter characteristics, if the primary and secondary differential filters have the same kernel size, the primary differential filter has a peak of a transmission range characteristic at a lower frequency side than that of the secondary differential filter. FIG. 10(a) illustrates characteristics of the two types of spatial filters using one-dimensional models. The primary differential filter is selected such that a peak appears at about 2 lp/mm. The secondary differential filter is selected such that a peak appears at about 4 lp/mm.

Figure 10B:
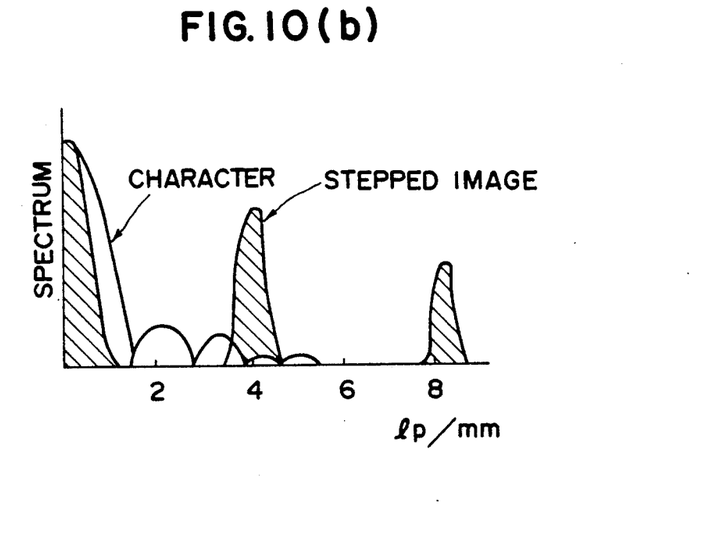
FIG. 10(b) is a graph showing spatial frequency characteristics of an edge image and a stepped image area.

FIG. 10(b) shows spatial frequency characteristics of a character area with a blurred edge and a stepped image area in a decoded image. In terms of frequencies, in a line image such as a character with a blurred edge, the power spectrum is continuously changed from a low-frequency side toward a high-frequency side. However, in a stepped image as shown in FIGS. 3(b) and 3(e), peaks of the power spectrum discontinuously and periodically appear at high-frequency components corresponding to a cycle of the step.

Therefore, since the transmission range is present at 2 lp/mm, the first spatial filter 9 can detect a spatial frequency component of a character edge, but cannot detect a spatial frequency component of an edge portion of a stepped image. However, in the second spatial filter 10, the transmission range is present at 4 lp/mm and the half-width of a peak representing the filter characteristics is wide. Therefore, the filter 10 can detect a frequency component of a character to have a spatial frequency of the stepped image as a center.

Figure 11:
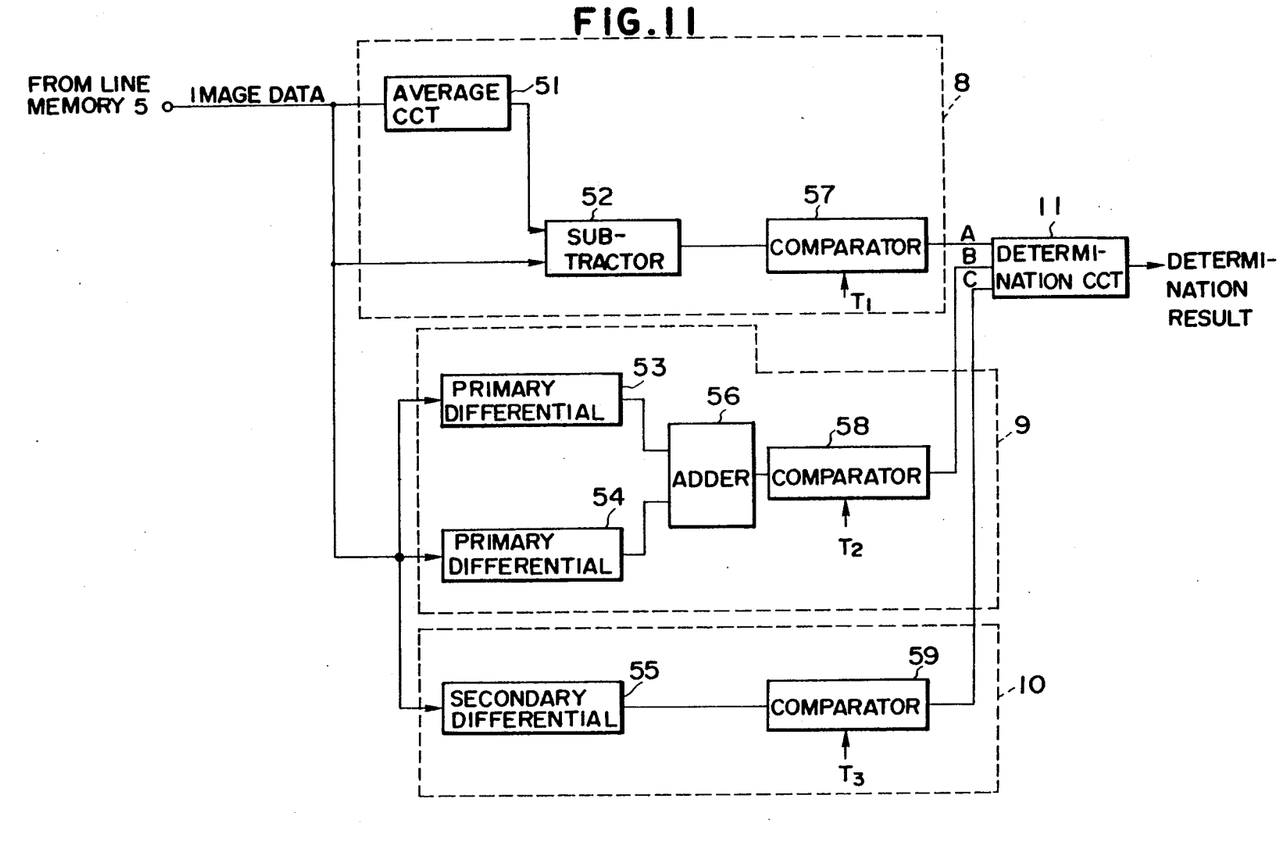
FIG. 11 is a detailed block diagram of a deterioration detection circuit for detecting image quality deterioration.

FIG. 11 is a detailed block diagram of the deterioration detection circuit 100 (FIG. 1) for determining an image area in an image. In the block diagram of FIG. 11, the density different detection circuit 8 comprises an average value calculation circuit 51 and a subtractor 52. The average value calculation circuit 51 receives one block of pixel data from the line memory 5, and performs addition and subtraction to calculate an average value in the block. One input terminal of the subtractor 52 receives the density of a pixel of interest (the central pixel if the 3×3 matrix is employed). The subtractor 52 calculates the absolute value of a difference between the average value and the density of the pixel of interest.

The absolute value of the difference is compared with a threshold value T1 by a comparator 57. If the difference between the image data of the pixel of interest and the average value is smaller, the comparator 57 determines that the pixel of interest is present in an area where image quality deterioration is low, and outputs data "0". In this case, the selector 12 selects the direct output 5a from the line memory 5. If the difference is larger, the comparator 57 determines that the pixel of interest is present in a character area with a blurred edge or a stepped image area, and outputs data "1". An output result A is input to the determination circuit 11.

One block of image data from the line memory 5 is input to the first spatial filter 9, i.e., to primary differentiators 53 and 54 shown in FIG. 11. The differentiators 53 and 54 perform the primary differential calculations shown in FIGS. 9(a) and 9(b), and output the absolute values of the calculation results, respectively. Each differentiator comprises multipliers for multiplying pixel densities with matrix coefficients corresponding to the pixels, and an adder for adding the products. Thus, the differentiator 53 detects an image edge at a relatively low frequency in the vertical direction, and the differentiator 54 detects a low-frequency edge in the horizontal direction. These outputs are added to each other by an adder 56, and the sum is compared with a predetermined threshold value T2 by a comparator 58. If the sum is larger than the threshold value T2, the comparator 58 determines that the low-frequency edge is present, and outputs data "1". If the sum is smaller, the comparator determines that no edge is found, and outputs data "0". An output result B is input to the determination circuit 11 as in the result A.

In the second spatial filter 9, a secondary differentiator 55 receives pixel data in a block, performs a secondary differential calculation shown in FIG. 9(c), and outputs the absolute value of the calculation result. The absolute value is compared with a predetermined threshold value T3 by a comparator 59. If the secondary differentiated value is larger than the threshold value T3, the comparator 59 determines that a high-frequency edge component of a stepped image is present, and outputs data "1". If the resultant value is smaller, the comparator 59 determines that no edge is present, and outputs data "0". A result C is input to the determination circuit 11.

TABLE 1

| Input | No Deterioration | Edge Portion | Stepped Image |
|---|---|---|---|
| A | 0 | 1 | 1 |
| B | X | 1 | 0 |
| C | X | 1 | 1 |

(where X indicates either "0" or "1" is possible)

Figure 12:
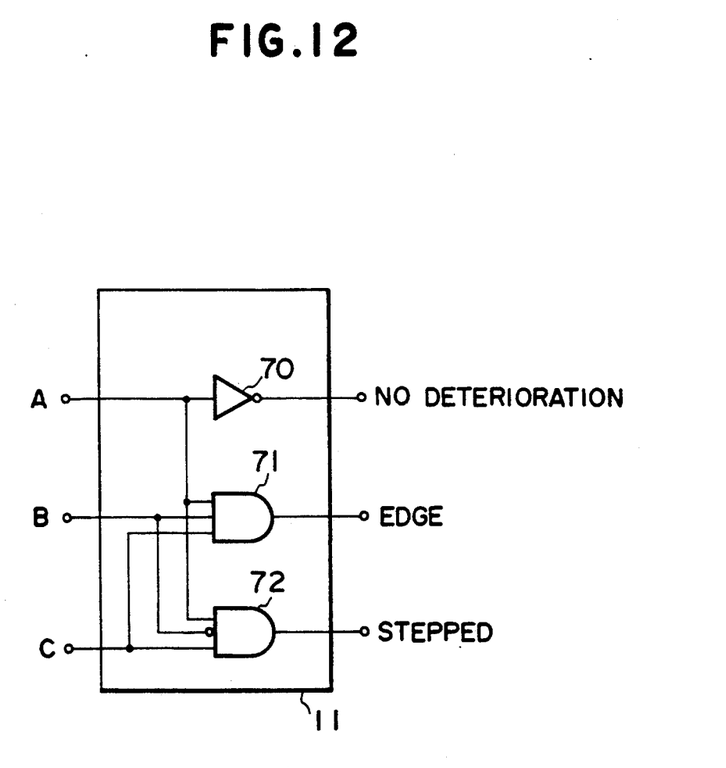
FIG. 12 is a circuit diagram showing an arrangement of a determination circuit.

When the output A is "1" and the outputs B and C are "1", as shown in Table 1, the determination circuit 11 determines a character area with a blurred edge. If the output B is "0" and the output C is "1", the circuit 11 determines a stepped image. The determination circuit as 11 may comprise a simple circuit shown in FIG. 12.

A signal obtained by inverting the output A through an inverter 70 is used for indicating an area where image quality is not deteriorated (for selecting the direct output from the line memory 5), and the outputs from AND gates 71 and 72 are respectively used for indicating a character area with a blurred edge portion (for selecting the output from the edge emphasis circuit 6) and for indicating a stepped image (for selecting the output from the smoothing circuit 7). The selector 12 shown in FIG. 1 is switched in accordance with these indication signals. More specifically, image data output from the selector 12 is image data whose image quality deterioration is corrected. Therefore, an image reproduced by the printer 13 is a high-quality image. In particular, an image which is enlarged at a work station having an enlargement function has noticeable image quality deterioration. In this case, the above embodiment is very effective.

In the above embodiment, edge emphasis and smoothing are performed by the correction circuit 100a in accordance with image quality deterioration. However, either one of the above image corrections may be performed depending on encoding methods.

<Modification>

If the printing apparatus is a facsimile system, the encoding circuit 1 is arranged in a reception-side facsimile, and the receiving circuit 3 is arranged in a transmission-side facsimile. When corrected image data is stored in a data storage apparatus instead of outputting a corrected image to the printer 13, the transmission circuit 2 and the reception circuit 3 are connected through a bus line.

In the above embodiment, block encoding has been exemplified. Therefore, image quality deterioration is determined in correspondence with the block encoding. If other irreversible encoding methods are employed, a transmission frequency of the filters need only be changed.

The image correction is not limited to edge emphasis and smoothing. For example, the present invention may be applied to correction such as interpolation for interpolating a lost pixel.

According to a decoding apparatus of encoded image data of this embodiment as described above, an image whose image quality is deteriorated due to irreversible encoding can be corrected to be an image free from image quality deterioration.

The preferred embodiment of the present invention has been described. However, the present invention is not limited to the above embodiment, and various changes and modifications may be made within the spirit and scope of the appended claims.

I claim:

1. A decoding apparatus for decoding encoded image data, comprising:
   decoding means for decoding encoded image data;
   first correction means for performing a first correction on the image data decoded by said decoding means;
   second correction means for performing a second correction on the image data decoded by said decoding means, the second correction being performed in parallel with the first correction; and
   selection means for selecting between using output from said first correction means and using output from said second correction means in accordance with characteristic of the image data decoded by said decoding means.

2. An apparatus according to claim 1, wherein said decoding means decodes image data which has been encoded by an irreversible encoding method.

3. An apparatus according to claim 1, wherein said decoding means decodes image data which is encoded in units of blocks each having a predetermined size.

4. An apparatus according to claim 1, wherein said first correction means performs smoothing processing on an image, and said second correction means performs edge emphasis processing on an image.

5. An apparatus according to claim 1, wherein said selection means detects characteristics of the image data decoded by said decoding means, and performs its selection operation in accordance with a result of such detection.

6. A decoding apparatus for decoding encoded image data, comprising:
   decoding means for decoding image data which has been divided into blocks and encoded by blocks;
   discriminating means for detecting an edge of the image data decoded by said decoding means and for discriminating whether or not deterioration has occurred in the edge as a result of the decoding; and
   correction means for correcting the edge in a case where the edge has been discriminated by said discriminating means as having suffered deterioration.

7. A decoding apparatus according to claim 6, wherein said discriminating means is arranged for performing its discrimination on both the edge of an original image and an apparent edge resulting from deterioration of a halftone image.

8. A decoding apparatus according to claim 7, wherein said discriminating means includes a plurality of detection means each for detecting edges of mutually different frequencies.

9. A decoding apparatus according to claim 7, wherein said decoding means decodes image data which has been encoded by an irreversible encoding method.

10. A decoding apparatus according to claim 7, wherein said correction means performs one of smoothing processing and edge emphasis processing.

11. A decoding apparatus according to claim 7, wherein said detection means detects a relationship between adjacent pixels.

12. A decoding apparatus for decoding encoded image data, comprising:
    decoding means for decoding encoded image data;
    detection means for detecting characteristics of the image data decoded by said decoding means, an output from said decoding means being supplied to said detection means; and
    correction means for correcting deterioration of the image data decoded by said decoding means, in accordance with a result of detection performed by said detection means, the output from said decoding means being supplied to said correction means.

13. A decoding apparatus according to claim 12, wherein said detection means and said correction means are arranged to be electrically in parallel.

14. A decoding apparatus according to claim 12, wherein said decoding means decodes image data which has been encoded by an irreversible encoding method.

15. A decoding apparatus according to claim 12, wherein said decoding means decodes image data which is encoded in units of blocks each having a predetermined size.

16. A decoding apparatus according to claim 12, wherein said correction means performs one of smoothing processing and edge emphasis processing.

17. A decoding apparatus according to claim 12, wherein said detecting means detects a relationship between adjacent pixels.

18. A method of processing encoded image data, comprising the steps of:
    decoding encoded image data;
    taking in the image data decoded in said decoding step and detecting the contents of an image represented by the image data; and
    correcting deterioration of the image data decoded in said decoding step in accordance with a detection result obtained in said detecting step.

19. A method according to claim 18, further comprising the step of changing correction processing in said correcting step in accordance with a detection result obtained in said detecting step.

20. A method according to claim 18, wherein said correcting step further includes one of smoothing processing and edge emphasis processing.

21. A method according to claim 18, wherein, in said decoding step, image data encoded by an irreversible encoding method is detected.

22. A method according to claim 18, wherein, in said decoding step, image data which is encoded in units of blocks, each having a predetermined size, is decoded.

23. A method according to claim 18, wherein, in said detecting step, a relationship between adjacent pixels is detected.

24. A decoding apparatus for decoding encoded image data, comprising:
   decoding means for decoding image data encoded block by block;
   detecting means for detecting image contents represented by the image data included in a predetermined size of block, from among the image data decoded by said decoding means, using the image data included in that block; and
   correction means for correcting deterioration of the image data included in that block in accordance with a detection result obtained by said detecting means.

25. A decoding apparatus according to claim 24, wherein said decoding means decodes image data which has been encoded by an irreversible encoding method.

26. A decoding apparatus according to claim 24, wherein said decoding means decodes image data which is encoded in units of blocks each having a predetermined size.

27. A decoding apparatus according to claim 24, wherein said correction means performs one of smoothing processing and edge emphasis processing.

28. A decoding apparatus according to claim 24, wherein said detection means detects a relationship between adjacent pixels.

* * * * *

UNITED STATES PATENT AND TRADEMARK OFFICE
CERTIFICATE OF CORRECTION

PATENT NO. : 5,023,919

DATED : June 11, 1991

INVENTOR(S) : MASAFUMI WATAYA

It is certified that error appears in the above-identified patent and that said Letters Patent is hereby corrected as shown below:

IN [57] ABSTRACT

Line 7, "smoothing the" should read --smoothing or the--.

COLUMN 8

Line 48, "detecting" should read --detection--.

Signed and Sealed this

Nineteenth Day of January, 1993

Attest:

DOUGLAS B. COMER

Attesting Officer     Acting Commissioner of Patents and Trademarks